United States Patent [19]

Weinberger

[11] 4,007,644
[45] Feb. 15, 1977

[54] BELT
[75] Inventor: Ernest F. Weinberger, Ardsley, N.Y.
[73] Assignee: SCM Corporation, New York, N.Y.
[22] Filed: Oct. 20, 1975
[21] Appl. No.: 623,691
[52] U.S. Cl. .................................. 74/229; 74/231 C
[51] Int. Cl.² ........................ F16H 7/00; F16G 1/28
[58] Field of Search ............... 74/229, 231 C, 243 R
[56] References Cited
UNITED STATES PATENTS

| | | | |
|---|---|---|---|
| 2,753,980 | 7/1956 | Ballard | 74/243 R X |
| 2,987,932 | 6/1961 | Szonn | 74/229 |
| 3,083,583 | 4/1963 | Szonn | 74/229 |
| 3,472,563 | 10/1969 | Irgens | 74/231 C X |
| 3,597,985 | 8/1971 | Jeffrey | 74/229 |
| 3,744,330 | 7/1973 | Sugimoto | 74/231 C X |

*Primary Examiner*—Leonard H. Gerin
*Attorney, Agent, or Firm*—Stanley J. Klem; Milton M. Wolson

[57] ABSTRACT

A power transmission drive belt having a plurality of equally spaced teeth of identical contour disposed along its length. The teeth include a crest with driving and trailing faces depending therefrom to a valley below. An apex is disposed on each tooth and in each valley to provide minimum engagement between the belt and a pulley, resulting in a quiet running power transmission drive system.

26 Claims, 3 Drawing Figures

BELT

BACKGROUND OF THE INVENTION

The present invention relates to power transmission drive systems for business machines and more particular to a drive belt having a plurality of equally spaced contour teeth that functionally engage corresponding equally spaced teeth of a pulley.

Noise associated with the transmission of power in high speed drives has always been an undesirable characteristic. Efforts to reduce the noise generated by high speed drives, in particular in business machines such as typewriters, have met with limited success.

Positive drive pulley and belt systems that operated at high speed usually generate objectionable noise to the surrounding environment. The origin of the noise can be attributed to a combination of factors; namely, the high rotational speed and the small motor pulley diameter that is necessary to obtain the desired speed ratios, and the initial contact of the belt teeth with the pulley teeth.

Although business machines in general are subject to noise generated by high speed positive drive systems, typewriters have been selected for purposes of this disclosure to emphasize the effect of noise in a quiet office area.

With the advent of portable electric typewriters, most of which are used in quiet environments, noise became increasingly more noticeable and disturbing. The efficiency of persons who require concentration or uninterrupted conversation with others has been known to be adversely affected by extraneous sounds. Cognizant of the desire for greater noise suppression in such equipment, typewriter manufacturers have implemented costly research programs to reduce the noise emission of typewriters and in particular, the drive system thereof.

Improvements to reduce the noise emission of typewriters have been attempted over the years, but none have been successful to a degree so as to meet with complete public acceptance. Efforts to reduce the sound vibrations initiated by the drive systems of business machines have also been made over a long period of time.

For example, U.S. Pat. No. 2,937,538 teaches a belt having teeth with convex working faces that cooperate with the plane faces of gear teeth to provide a quiet drive system. The quiet drive system results from the conjugate relationship of the faces of the gear teeth and the belt teeth where the convex working face of the belt teeth imparts a cushioning effect between the belt and the gear when engaged by the plane faces of the gear teeth.

Another example of a silent drive belt is disclosed in U.S. Pat. No. 2,815,671 which teaches a drive belt having wear resistant resilient rubber teeth united by a cushioning layer of softer rubber to an endless flexible load carrying band. The resilient rubber teeth in combination with the softer cushioning layer of rubber attached thereto contact the harder pulley teeth to produce a silent operating belt.

The above prior art has provided reduced noise transmission by high speed drives, but has not accomplished the degree of quietness required in a drive system of a business machine. Furthermore, the prior art has attempted to accomplish noise reduction in a manner that is substantially different from the present inventive concept.

The present invention relies on minimum and efficient driving contact between the belt and the pulley and depends entirely on the contour of the teeth of the belt and valleys therebetween, used in conjunction with a conventional positive drive pulley to transmit power from one location to another with slippage between the belt and the pulley. This structure results in minimum and efficient driving contact between the teeth of the belt and the teeth of the pulley to result in a quiet drive system.

The term "valleys" referred to in this disclosure, includes that portion of the belt from the base of one tooth to the base of an adjacent tooth including the opposing faces thereof.

U.S. Pat. No. 2,937,538 teaches full contact between all teeth of the belt and the pulley and further teaches belt teeth having convex working faces in conjugate functional relationship with plane working faces on the teeth of a mating pulley. To obtain a quieter drive system, the belt teeth include convex working faces to provide a rolling contact with the plane faces of the pulley teeth and further provide a cushioning effect between the belt and pulley. The full functional contact between the teeth of the belt and the teeth of the pulley is not desirable in that excessive noise is generated by the initial contact therebetween. The contact surface being related to the noise generated.

The present invention has as its primary purpose to provide a minimum functional contact between the belt teeth and pulley teeth. The minimum contact of the belt teeth and pulley teeth results in a power transmission drive system where noise normally generated by such devices is substantially reduced.

U.S. Pat. No. 2,815,671 teaches a positive drive belt having conventional teeth thereon in spaced relationship. The teeth are united by a cushioning layer of soft rubber to an endless flexible load carrying band. Therefore, when the belt teeth functionally engage a pulley, the engagement is cushioned by the fact that the cushioned layer structure of the belt yields under the driving load on the belt. This patent also teaches full contact between the teeth of the belt and the teeth of the pulley. Although the belt is provided with a cushioned structure to impart quietness to the drive system, the full contact between the teeth of the belt and the teeth of the pulley allows initial contact noise to occur, the prevention of which is one specific object of the present inventive concept. It has been found that a slopping noise is prevalent in conventional high speed positive drive belt and pulley systems where the teeth of the belt and the teeth of the pulley are in full contact.

The term "conventional high speed positive drive belt" referred to in this disclosure is an endless flexible power transmission belt having conventional spaced teeth projecting therefrom.

SUMMARY OF THE INVENTION

The illustrated embodiment provides a belt for high speed positive drive power transmission. One of the surfaces of the belt is uninterrupted along its length and another surface defining a driving surface is provided with contoured teeth projecting therefrom. The crest of each tooth is unidirectionally sloped whereby the teeth of a conventional positive drive pulley in mesh with the contoured teeth of the belt and contoured valleys therebetween produce a quiet high speed positive drive power transmission system for business machines.

The term "conventional positive drive pulley" as herein referred to, generally refers to a pulley having a plurality of teeth disposed along its periphery. The teeth include a flat crest with opposing tooth faces depending therefrom and terminating in a flat valley therebetween.

Accordingly, an object of the present invention is to provide a drive belt that relies on minimum and efficient driving contact between the belt and an associated conventional pulley.

Another object of the present invention is to provide a belt where only a single belt tooth drivingly engages a single pulley tooth.

Another object of the present invention is to provide a quiet high-speed power transmission drive system for typewriters.

Another object of the present invention is to provide a belt where, in combination with a conventional pulley, a rolling engagement therebetween is obtained.

Another object of the present invention is to provide a belt whereby the contact between the belt teeth and the valleys between the belt teeth is reduced to a minimum.

A still further object of the present invention is to provide a belt whereby the angular rotation from the support of one belt tooth to the next belt tooth is at a minimum.

A still further object of the present invention is to provide a belt that can be used with any matched standard positive drive pulley.

Other objects, features, and advantages of the invention will become more apparent from the following description, appended claims and accompanying drawing.

DESCRIPTION OF THE PREFERRED EMBODIMENT

Figure 1:
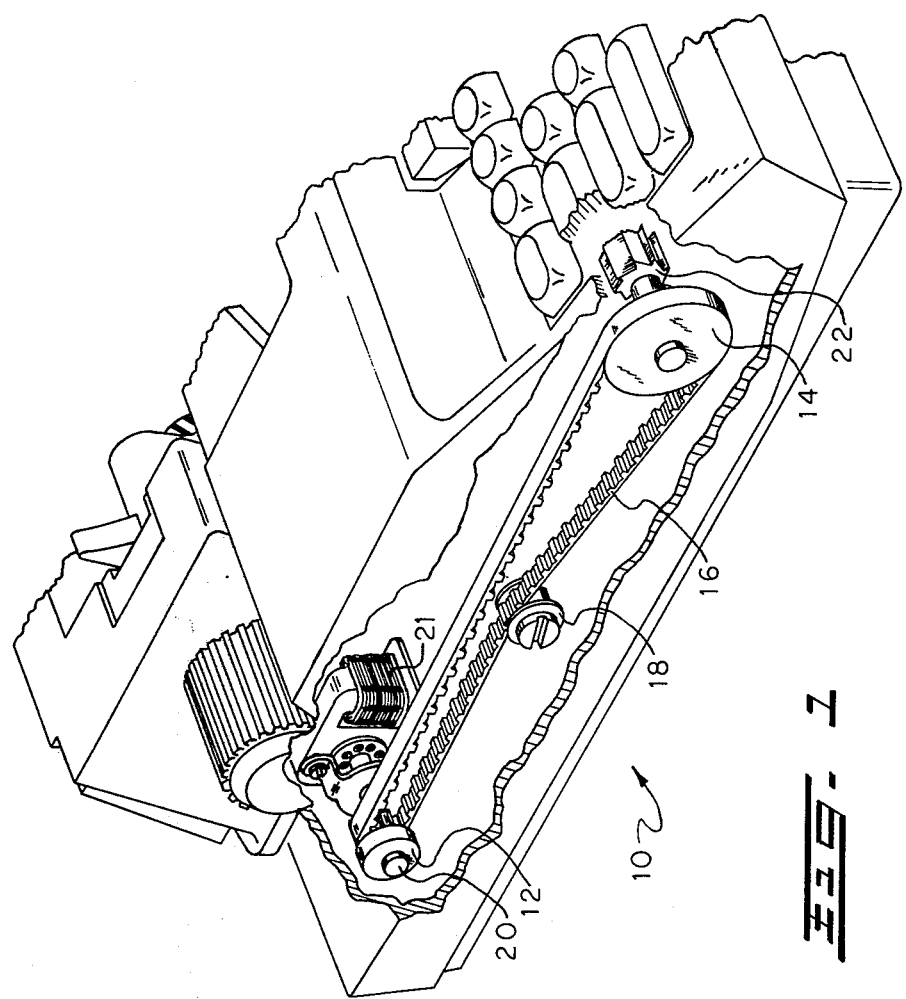
FIG. 1 is a perspective view of a portion of a typewriter with the belt made in accordance with the present invention.

In reference to FIG. 1, there is shown a portion of a typewriter 10 that includes a conventional toothed drive pulley 12, a conventional toothed driven pulley 14, and a positive drive power transmission drive belt 16 functionally engaged therebetween. Intermediate pulley 12 and pulley 14 is a belt take-up pulley 18, the significance of which is unrelated to the present invention, but is shown for purposes of technical clarity relative to the take-up of belt slack in power transmission belts.

Pulley 12 is fixed to a drive shaft 20 of a drive motor 21 and is urged to rotate counterclockwise. Belt 16 is driven by pulley 12 which rotates pulley 14 counterclockwise. Pulley 14 is fixed to a power roll 22 and transmits power from drive pulley 12 via belt 16 to driven pulley 14 and power roll 22 and thereafter to the various typewriter instrumentalities.

Figure 2:
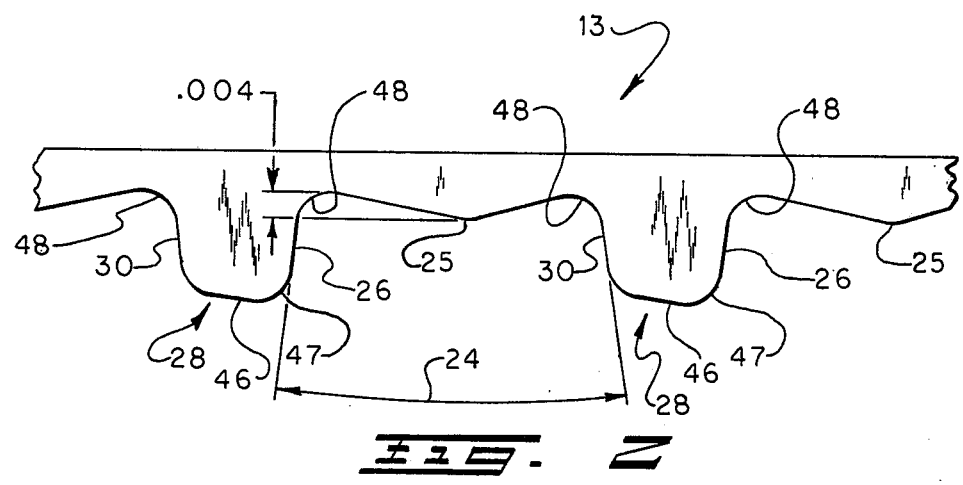
FIG. 2 is an enlarged view that diagrammatically illustrates the contour of a segment of a belt.

In FIG. 2, there is shown a segment 13 of belt 16 that specifically illustrates two identical adjacent belt teeth and their contour. Although only two teeth are shown, it is to be understood that like spaced teeth having identical contours are disposed in like fashion along the entire length of belt 16. The teeth of belt 16 extend transverse of its width to define a contoured valley 24 therebetween.

The term "valley" as it relates to the belt teeth in this disclosure is defined by the included opening or space between a driving face 26 of a tooth 28 of belt 16 and a trailing face 30 of an adjacent tooth.

Figure 3:
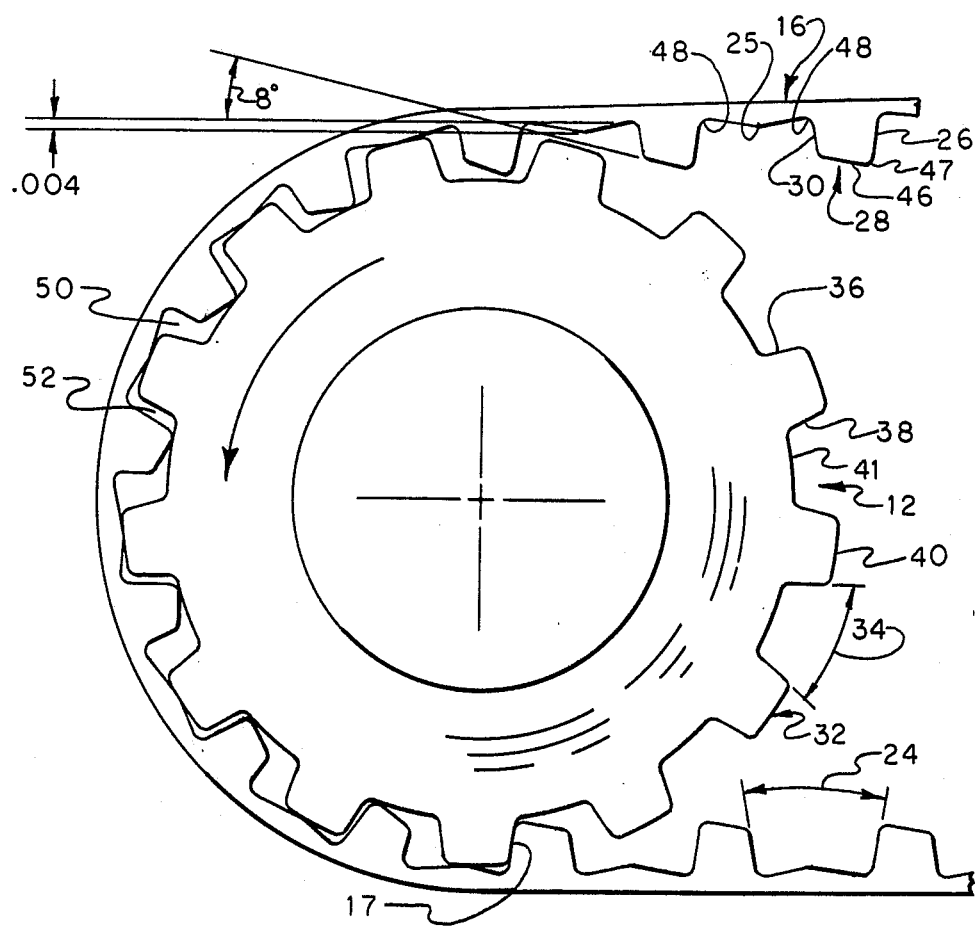
FIG. 3 is an enlarged view illustrating the cooperating relationship of a positive drive pulley with the belt of this invention.

Fully shown in FIG. 3 is belt 16 in functional engagement with a conventional toothed pulley 12. Pulley 12 is equal in width to the width of belt 16 and includes a plurality of identical teeth 32 that are equally spaced along its periphery. Pulley teeth 32 extend transverse of its width to define a valley 34 therebetween. The term "valley" as it relates to the pulley teeth in this disclosure is defined by the included opening or space between a driving face 36 of a tooth 32 and a trailing face 38 of an adjacent tooth. Pulley teeth 32 are defined by driving face 36, trailing face 38, and a tooth crest 40 therebetween.

As shown in FIG. 2, belt teeth 28 are defined by a driving face 26, a trailing face 30, and connecting crest 46 therebetween. Tooth faces 26 and 30 depend from tooth crest 46 and terminate at a base 48 of valley 24. Tooth crest 46 includes an apex 47 disposed proximate driving face 26 and depends from apex 47 to trailing face 30. In the disclosed embodiment, the included angle defined by driving face 26 and tooth crest 46 of belt tooth 28 is an acute angle. Belt tooth driving face 26 depends from tooth crest apex 47 to valley base 48 at angle corresponding to the angle of driving face 36 of pulley 12. The term "valley base" as it relates to this disclosure is defined as the lowermost surface of valley 24 in relation to the tooth apexes. Belt tooth crest 46 depends from tooth crest apex 47 at an angle of 8° to terminate in trailing face 30 as shown in FIG. 3. This angular relationship has been found to provide excellent noise reduction although other angular configurations also reduce noise and may be employed. Trailing face 30 depends from tooth crest 46 to valley base 48.

Although in the preferred embodiment all tooth apexes and valley bases are defined by radii; it is to be understood that the radii are for purposes of longer belt life and do not necessarily constitute a significant part of the invention.

As clearly illustrated in FIG. 3, tooth valley 24 of belt 16 is of greater dimension than the overall length of any tooth 32 of pulley 12. The length of a pulley tooth as it relates to this disclosure is defined as the included dimension between the driving and trailing faces of any pulley tooth.

Further illustrated in FIG. 3, pulley tooth valley 34 is clearly shown to be greater than the overall length of any tooth of belt 16. The length of a belt tooth is defined by the included dimension between the driving and trailing faces of any belt tooth.

Tooth valley 24 is contoured to define an apex 25 that is centrally disposed between the apexes of adjacent teeth 28. The height of valley apex 25 may be varied according to conditions such as the driving speed of the belt, the load that it will be subjected to during operation, the belt material, etc. However, it is preferred in the present embodiment, that valley apex 25 be a minimum height above valley base 48. In the preferred embodiment, a belt has been selected and modified to meet the requirements of the present invention. The valley apex 25 of the selected belt is positioned 0.004 above valley base 48. While a specific height of valley apex 25 has been selected by the applicant in that it provides excellent noise reduction, other height variations also reduce noise and may be employed. The dimension is a measured distance which is normal to the outer surface of belt 16.

It can therefore be seen from the foregoing that at no time will teeth 32 of pulley 12 contact any trailing face 30 of belt 16. Furthermore, the radial distances between the driving faces of adjacent teeth of belt 16 or any other radial distances between the driving faces of adjacent teeth is greater than the radial distance between the driving faces of any two adjacent teeth of pulley 12. This is clearly shown in FIG. 3 as clearance space 50 and clearance space 52, a relationship that exists for all in-mesh belt and pulley teeth of the instant invention. Hence, the driving face of only one tooth of belt 16 will be in driving contact with only one driving face of one tooth of pulley 12 at any and all times. This point of contact is clearly shown as reference number 17 in FIG. 3. All teeth of pulley 12 will contact the valleys 24 of belt 16 in a roll free engagement and disengagement about valley apexes 25.

A roll free engagement and disengagement between the teeth of belt 16 and the teeth of pulley 12 is obtained in the following manner. Each tooth crest of pulley 12 contacts belt 16 at valley apex 25 and each tooth crest of pulley 12 being thereafter supported by valley apex 25, rolls relative to apex 25 during its radial movement along the engaging periphery of belt 16.

This roll free engagement and disengagement is desirable in that it results in a quieter operation when the belt engages the pulley.

In operation, teeth 32 of pulley 12 are in peripheral engagement with teeth 28 of belt 16 and are continuously out of contact with the driving and trailing faces of the belt teeth except for the crest 40 of pulley teeth 32 which contacts the belt valley apexes 25 and a tooth base 41 which contacts the belt tooth crest apex 47. Therefore, belt 16 is driven by means of the last in-mesh tooth of belt 16, engaging the last in-mesh tooth of pulley 12. All preceeding teeth of pulley 12 are disengaged from the preceeding teeth of belt 16, except for the tooth crests 40 of pulley teeth 32 being in a roll free contact with each and every valley apex 25 of belt 16 and the bases 41 which contact each and every tooth crest apex 47 of belt 16. Under load conditions pulley 12 is in peripheral toothed engagement with belt 16 and as the next engaging tooth of belt 16 approaches pulley tooth 32 the pulley tooth enters into the center of belt valley 24 thereby providing quiet initial engagement. Pulley tooth crest 40 contacts valley apex 25 without deformation thereof. Therefore, pulley tooth crest 40 and tooth base 41 alternately rolls into and out of engagement with belt valley apex 25 and belt tooth crest 46 respectively. In this manner, the drive contact between pulley 12 and belt 16 is minimum and the initial contact noise substantially reduced.

As pulley 12 continues to rotate in peripheral engagement with belt 16, pulley tooth base 41 contacts belt tooth apex 47, but the tooth faces of pulley 12 do not make contact with the belt tooth faces at this time. As pulley 12 continues to rotate, the clearance between pulley tooth driving faces 36 and belt tooth driving faces 26 progressively decreases until pulley tooth driving face 36 of the last engaging pulley tooth engages belt tooth driving face 26 of the last engaging pulley tooth at contact point 17 at which time belt 16 is driven. As base 41 of pulley tooth 32 contacts belt tooth 28 at tooth crest apex 47, it does not contact the remaining portion of tooth crest 46. The clearance between pulley tooth base 41 and pulley tooth crest 40 is maintained along the entire peripheral engagement of pulley 12 and belt 16. The minimum tooth contact between belt 16 and pulley 12 results in a substantially quiet engagement between the teeth compared to the slopping noise caused by the contact of the flat teeth of a positive drive pulley with the flat crests of the teeth of a standard toothed belt.

The combination of the contoured belt tooth crest resulting in a minimum contact with the pulley; the raised apex in the valley between the belt teeth which further minimizes the contact between the belt and pulley; and the central disposition of the apex between the tooth crest apexes rather than the teeth themselves to give more uniform support to the belt, provides a quieter contact between the belt and the pulley and results in a quieter running power transmission drive system.

While the foregoing description has shown and described the fundamental novel features as applied to a preferred embodiment, it will be understood by those skilled in the art that modifications embodied in various forms may be made without departing from the spirit and scope of the invention.

What is claimed is:

1. A power transmitting toothed belt comprising:
    means to provide a single tooth driving contact between the toothed belt and the pulley; and
    means on the toothed belt including an apex between the teeth to provide minimal contact between the tooth valleys of the belt and the teeth of the pulley.

2. A toothed belt as defined in claim 1 wherein said driving contact means includes the toothed belt formed to provide single toothed driving contact between the belt and the pulley.

3. A toothed belt as defined in claim 1 wherein the toothed belt includes teeth having a driving face and a trailing face and the pulley includes a plurality of teeth corresponding to said belt teeth and said single tooth engagement is defined by the engagement of said driving face of said single belt tooth and the driven face of said corresponding pulley tooth.

4. A toothed belt as defined in claim 3 wherein said minimal valley contact means of the toothed belt includes an apex in the tooth valleys of the belt.

5. A toothed belt as defined in claim 3 wherein said minimal contact means of the toothed belt includes an apex on said belt teeth for providing minimal tooth contact between the belt and the pulley.

6. A toothed belt as defined in claim 3 wherein the toothed belt includes an apex between the teeth of the toothed belt and an apex on the teeth of the toothed belt for providing minimal contact between the belt and the pulley.

7. A toothed belt as defined in claim 5 wherein said belt tooth apex is proximate said belt tooth driving face.

8. A toothed belt as defined in claim 6 wherein said apex in the tooth valleys is centrally disposed between said apexes on the teeth of the toothed belt.

9. A toothed belt as defined in claim 1 wherein said minimal valley contact means includes an apex between the teeth of the toothed belt for providing minimal contact between the belt and the pulley.

10. A toothed belt as defined in claim 1 wherein said minimal tooth contact means includes an apex on the teeth of the toothed belt for providing minimal contact between the pulley and the belt.

11. A toothed belt as defined in claim 1 wherein said minimal contact means includes an apex in the tooth valleys on the toothed belt and an apex on the teeth of the toothed belt.

12. A toothed belt as defined in claim 1 wherein said minimal tooth contact means includes the belt teeth having a driving face, a trailing face and a tooth crest therebetween, said tooth crest includes an apex proximate said driving face and decreases in height from said apex to said trailing face.

13. A pulley as defined in claim 12 wherein said tooth crest and said driving face define an acute angle.

14. An improved electric typewriter having a motor and a motor shaft extending therefrom, a toothed pulley fixed on the motor shaft and a function shaft for operating a typewriter function, the improvement comprising:
a coupling between the motor and the function shaft comprising a toothed belt; and
means on said toothed belt including an apex between the teeth to provide minimum contact between said toothed belt and the toothed pulley for minimizing the generation of audible noise.

15. An electric typewriter as defined in claim 14 wherein said minimum contact means further includes a driving engagement of less than all the teeth of said toothed belt.

16. An electric typewriter as defined in claim 14 wherein said minimum contact means includes a single tooth driving engagement between said toothed belt and the pulley.

17. An electric typewriter as defined in claim 16 wherein said toothed belt includes teeth having a driving face and a trailing face and a tooth crest therebetween, said tooth crest includes an apex proximate said driving face and the pulley includes a plurality of teeth corresponding to said belt teeth and said single tooth driving engagement is defined by said driving face of said single tooth and the corresponding pulley tooth.

18. An electric typewriter as defined in claim 14 wherein said minimum contact means includes an apex between the teeth on the toothed belt.

19. An electric typewriter as defined in claim 14 wherein said minimum contact means includes an apex on the teeth of the toothed belt.

20. An electric typewriter as defined in claim 14 wherein said means includes an apex between the teeth on the toothed belt and an apex on the teeth of the toothed belt.

21. An electric typewriter as defined in claim 17 wherein said belt tooth apex is proximate said belt tooth driving face.

22. An electric typewriter as defined in claim 21 wherein said apex between the teeth is centrally disposed between said apexes on the teeth of the toothed belt.

23. An electric typewriter as defined in claim 17 wherein said belt tooth crest and said tooth driving face define an acute angle.

24. A belt for transmitting power comprising:
a plurality of teeth spaced along the periphery thereof; and an apex between the teeth.

25. A belt as defined in claim 24 wherein said tooth apex is proximate a belt tooth face.

26. A belt as defined in claim 25 wherein said belt tooth face is a driving face.

* * * * *